United States Patent
Cagno et al.

(10) Patent No.: US 8,219,740 B2
(45) Date of Patent: Jul. 10, 2012

(54) FLASH SECTOR SEEDING TO REDUCE PROGRAM TIMES

(75) Inventors: Brian J. Cagno, Tucson, AZ (US); John C. Elliott, Tucson, AZ (US); Gregg S. Lucas, Tucson, AZ (US); Kenny N. Qiu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 12/146,098

(22) Filed: Jun. 25, 2008

(65) Prior Publication Data

US 2009/0327578 A1     Dec. 31, 2009

(51) Int. Cl.
    *G06F 12/00*          (2006.01)
(52) U.S. Cl. ...................................................... 711/103
(58) Field of Classification Search .................. 711/100, 711/103
See application file for complete search history.

(56) References Cited

U.S. PATENT DOCUMENTS

| | | | |
|---|---|---|---|
| 4,974,118 A | | 11/1990 | Rounds |
| 5,262,999 A | | 11/1993 | Etoh et al. |
| 5,430,674 A | * | 7/1995 | Javanifard .................. 365/185.1 |
| 5,438,549 A | | 8/1995 | Levy |
| 5,496,939 A | | 3/1996 | Maruyama |
| 5,555,371 A | | 9/1996 | Duyanovich et al. |
| 5,644,531 A | | 7/1997 | Kuo et al. |
| 5,661,349 A | | 8/1997 | Luck |
| 5,732,238 A | | 3/1998 | Sarkozy |
| 5,793,776 A | | 8/1998 | Qureshi et al. |
| 5,944,837 A | | 8/1999 | Talreja et al. |
| 6,016,472 A | | 1/2000 | Ali |
| 6,236,593 B1 | * | 5/2001 | Hong et al. .............. 365/185.11 |
| 6,282,670 B1 | | 8/2001 | Rezaul Islam et al. |
| 6,292,868 B1 | * | 9/2001 | Norman ....................... 711/103 |
| 6,378,033 B1 | | 4/2002 | Nishikawa |
| 6,496,939 B2 | | 12/2002 | Portman et al. |

(Continued)

FOREIGN PATENT DOCUMENTS

JP     2000194607 A     7/2000

(Continued)

OTHER PUBLICATIONS

Jesung Kim et al., A Space-Efficient Flash Translation Layer for Compactflash Systems, May 2002, IEEE Transactions on Consumer Electronics, vol. 48, No. 2, pp. 366-375.*

(Continued)

*Primary Examiner* — Sheng-Jen Tsai
*Assistant Examiner* — Jaehwan Oh
(74) *Attorney, Agent, or Firm* — Stephen R. Tkacs; Stephen J. Walder, Jr.; Randall J. Bluestone

(57) ABSTRACT

A non-volatile flash memory comprises a plurality of non-volatile memories where a first non-volatile memory is pre-programmed (erased) with all ones, and at least a second non-volatile memory is pre-programmed with a seed value that takes advantage of the reduced programming time for less than six zeros. When writing (programming) a data byte, the memory system looks up the data byte in one or more seed tables to determine a portion of non-volatile memory to which the memory system may write the data byte with a reduced programming time. The memory system then records the location of the data byte in an address translation table so the data byte may be accessed.

10 Claims, 7 Drawing Sheets

U.S. PATENT DOCUMENTS

| | | | |
|---|---|---|---|
| 6,658,435 | B1 | 12/2003 | McCall |
| 6,680,548 | B2 | 1/2004 | Shiue et al. |
| 6,785,786 | B1 | 8/2004 | Gold et al. |
| 7,143,298 | B2 | 11/2006 | Wells et al. |
| 7,315,951 | B2 | 1/2008 | Hanrieder et al. |
| 7,451,348 | B2 | 11/2008 | Pecone et al. |
| 7,796,429 | B2 * | 9/2010 | Kanno et al. ............ 365/185.03 |
| 8,037,380 | B2 | 10/2011 | Cagno et al. |
| 8,040,750 | B2 | 10/2011 | Cagno et al. |
| 2002/0029354 | A1 | 3/2002 | Forehand et al. |
| 2004/0052502 | A1 | 3/2004 | Komatsu et al. |
| 2004/0218434 | A1 | 11/2004 | Hwang et al. |
| 2004/0224192 | A1 | 11/2004 | Pearson |
| 2005/0010838 | A1 | 1/2005 | Davies et al. |
| 2005/0055491 | A1 * | 3/2005 | Macri et al. ........................ 711/1 |
| 2005/0063217 | A1 | 3/2005 | Shiraishi et al. |
| 2005/0283648 | A1 | 12/2005 | Ashmore |
| 2006/0015683 | A1 | 1/2006 | Ashmore et al. |
| 2006/0047985 | A1 | 3/2006 | Otani |
| 2006/0108875 | A1 | 5/2006 | Grundmann et al. |
| 2006/0212644 | A1 | 9/2006 | Acton et al. |
| 2006/0248269 | A1 * | 11/2006 | Shona ........................... 711/103 |
| 2006/0255746 | A1 | 11/2006 | Kumar et al. |
| 2006/0259756 | A1 | 11/2006 | Thompson et al. |
| 2006/0264188 | A1 | 11/2006 | Mars et al. |
| 2007/0002675 | A1 | 1/2007 | Koo |
| 2007/0033433 | A1 | 2/2007 | Pecone et al. |
| 2007/0133277 | A1 * | 6/2007 | Kawai et al. ............ 365/185.03 |
| 2007/0180184 | A1 * | 8/2007 | Sakashita et al. ............ 711/100 |
| 2008/0016385 | A1 | 1/2008 | Hollingsworth et al. |
| 2008/0086615 | A1 | 4/2008 | Elliott et al. |
| 2008/0201622 | A1 | 8/2008 | Hiew et al. |
| 2009/0254772 | A1 | 10/2009 | Cagno et al. |
| 2009/0323452 | A1 | 12/2009 | Cagno et al. |
| 2010/0011261 | A1 | 1/2010 | Cagno et al. |
| 2010/0052625 | A1 | 3/2010 | Cagno et al. |

FOREIGN PATENT DOCUMENTS

| | | | |
|---|---|---|---|
| JP | | 2002312250 A | 10/2002 |

OTHER PUBLICATIONS

USPTO U.S. Appl. No. 12/099,373.
USPTO U.S. Appl. No. 12/145,969.
USPTO U.S. Appl. No. 12/169,273.
USPTO U.S. Appl. No. 12/204,456.
U.S. Appl. No. 12/145,969, filed Jun. 25, 2008, Cagno et al.
U.S. Appl. No. 12/099,373, filed Apr. 8, 2008, Cagno et al.
U.S. Appl. No. 12/204,456, filed Sep. 4, 2008, Cagno et al.
U.S. Appl. No. 12/169,273, filed Jul. 8, 2008, Cagno et al.
"Patented Wear Leveling", BitMicro Networks, http://www.bitmicro.com/products_edisk_features_wearlevel.php, Printed Jul. 8, 2008, 2 pages. BitMicro Networks.
"Method and Procedure to Minimize Peak Power Load During Backup of Volatile Memory with Flash Memory Devices", IBM Technical Disclosure, http://www.ip.com/pubview/IPCOM000167428D, Feb. 13, 2008, 6 pages.
Office Action mailed Feb. 3, 2011 for U.S. Appl. No. 12/169,273, 14 pages.
Response to Office Action filed with the USPTO on Mar. 7, 2011 for U.S. Appl. No. 12/099,373, 14 pages.
Response to Office Action filed with the USPTO on Mar. 24, 2011 for U.S. Appl. No. 12/145,969, 19 pages.
Thomasian, Alexander, "Priority Queuing in Raid5 Disk Arrays with an NVS Cache", Modeling, analysis, and Simulation of Computer and Telecommunication Systems, 1995. MASCOTS '95., Proceedings of the Third International Workshop on, vol., no., pp. 168-172, Jan. 18-20, 1995 doi: 10.1109/MASCOT.1995.378692.
Varma, Anujan, et al. "Destage Algorithms for Disk Arrays with Nonvolatile Caches", Computers, IEEE Transactions on, vol. 47, No. 2, pp. 228-235, Feb. 1998 doi: 10.1109/12.663770, URL: http://ieeexplore.ieee.org/stamp/stamp.jsp?tp=&arnumber=663770&isnumber=14539.
Interview Summary mailed Apr. 28, 2011 for U.S. Appl. No. 12/169,273, 3 pages.
Response to Office Action filed with the USPTO on Apr. 29, 2011 for U.S. Appl. No. 12/169,273, 10 pages.
"Using Compression to Expedite Hardening Process of a Non-Volatile Memory DIMM System", IBM Technical Disclosure, http://www.ip.com/pubview/IPCOM000167472D, Feb. 15, 2008, 4 pages.
Notice of Allowability mailed Jun. 13, 2011 for U.S. Appl. No. 12/169,273, 3 pages.
Notice of Allowance mailed Jun. 9, 2011 for U.S. Appl. No. 12/145,969, 18 pages.
Notice of Allowance mailed Jun. 9, 2011 for U.S. Appl. No. 12/169,273, 9 pages.
Office Action mailed Jun. 22, 2011 for U.S. Appl. No. 12/099,373, 12 pages.
Supplemental Notice of Allowability mailed Jul. 29, 2011 for U.S. Appl. No. 12/145,969, 11 pages.
Notice of Allowance mailed Sep. 2, 2011 for U.S. Appl. No. 12/204,456, 15 pages.
Response to Office Action filed Sep. 20, 2011 for U.S. Appl. No. 12/099,373, 11 pages.
Notice of Allowance mailed Dec. 15, 2011 for U.S. Appl. No. 12/099,373; 13 pages.
US 7,278,054, 10/2007, Davies et al. (withdrawn)

* cited by examiner

| NUMBER OF ZEROS IN DATA BYTE | PROGRAMMING TIME |
|---|---|
| 6, 7, OR 8 | 12.7 μs |
| 1, 2, 3, 4, OR 5 | 9.8 μs |
| NONE | 2.1 μs |

FIG. 6A

| NO SEED REQUIRED | | |
|---|---|---|
| DECIMAL | HEX | BINARY |
| 7 | 07 | 00000111 |
| 11 | 0B | 00001011 |
| 13 | 0D | 00001101 |
| 14 | 0E | 00001110 |
| 15 | 0F | 00001111 |
| 19 | 13 | 00010011 |
| 21 | 15 | 00010101 |
| 22 | 16 | 00010110 |
| 23 | 17 | 00010111 |
| 25 | 19 | 00011001 |
| 26 | 1A | 00011010 |
| 27 | 1B | 00011011 |
| 28 | 1C | 00011100 |
| 29 | 1D | 00011101 |
| 30 | 1E | 00011110 |
| 31 | 1F | 00011111 |
| 35 | 23 | 00100011 |
| 37 | 25 | 00100101 |
| 38 | 26 | 00100110 |
| 39 | 27 | 00100111 |
| 41 | 29 | 00101001 |
| 42 | 2A | 00101010 |
| 43 | 2B | 00101011 |
| 44 | 2C | 00101100 |
| 45 | 2D | 00101101 |
| 46 | 2E | 00101110 |
| 47 | 2F | 00101111 |
| 49 | 31 | 00110001 |
| 50 | 32 | 00110010 |

| DECIMAL | HEX | BINARY |
|---|---|---|
| 51 | 33 | 00110011 |
| 52 | 34 | 00110100 |
| 53 | 35 | 00110101 |
| 54 | 36 | 00110110 |
| 55 | 37 | 00110111 |
| 56 | 38 | 00111000 |
| 57 | 39 | 00111001 |
| 58 | 3A | 00111010 |
| 59 | 3B | 00111011 |
| 60 | 3C | 00111100 |
| 61 | 3D | 00111101 |
| 62 | 3E | 00111110 |
| 63 | 3F | 00111111 |
| 67 | 43 | 01000011 |
| 69 | 45 | 01000101 |
| 70 | 46 | 01000110 |
| 71 | 47 | 01000111 |
| 73 | 49 | 01001001 |
| 74 | 4A | 01001010 |
| 75 | 4B | 01001011 |
| 76 | 4C | 01001100 |
| 77 | 4D | 01001101 |
| 78 | 4E | 01001110 |
| 79 | 4F | 01001111 |
| 81 | 51 | 01010001 |
| 82 | 52 | 01010010 |
| 83 | 53 | 01010011 |
| 84 | 54 | 01010100 |
| 85 | 55 | 01010101 |

| DECIMAL | HEX | BINARY |
|---|---|---|
| 86 | 56 | 01010110 |
| 87 | 57 | 01010111 |
| 88 | 58 | 01011000 |
| 89 | 59 | 01011001 |
| 90 | 5A | 01011010 |
| 91 | 5B | 01011011 |
| 92 | 5C | 01011100 |
| 93 | 5D | 01011101 |
| 94 | 5E | 01011110 |
| 95 | 5F | 01011111 |
| 97 | 61 | 01100001 |
| 98 | 62 | 01100010 |
| 99 | 63 | 01100011 |
| 100 | 64 | 01100100 |
| 101 | 65 | 01100101 |
| 102 | 66 | 01100110 |
| 103 | 67 | 01100111 |
| 104 | 68 | 01101000 |
| 105 | 69 | 01101001 |
| 106 | 6A | 01101010 |
| 107 | 6B | 01101011 |
| 108 | 6C | 01101100 |
| 109 | 6D | 01101101 |
| 110 | 6E | 01101110 |
| 111 | 6F | 01101111 |
| 112 | 70 | 01110000 |
| 113 | 71 | 01110001 |
| 114 | 72 | 01110010 |
| 115 | 73 | 01110011 |

| DECIMAL | HEX | BINARY |
|---|---|---|
| 116 | 74 | 01110100 |
| 117 | 75 | 01110101 |
| 118 | 76 | 01110110 |
| 119 | 77 | 01110111 |
| 120 | 78 | 01111000 |
| 121 | 79 | 01111001 |
| 122 | 7A | 01111010 |
| 123 | 7B | 01111011 |
| 124 | 7C | 01111100 |
| 125 | 7D | 01111101 |
| 126 | 7E | 01111110 |
| 127 | 7F | 01111111 |
| 131 | 83 | 10000011 |
| 132 | 84 | 10000100 |
| 133 | 85 | 10000101 |
| 134 | 86 | 10000110 |
| 135 | 87 | 10000111 |
| 137 | 89 | 10001001 |
| 138 | 8A | 10001010 |
| 139 | 8B | 10001011 |
| 140 | 8C | 10001100 |
| 141 | 8D | 10001101 |
| 142 | 8E | 10001110 |
| 143 | 8F | 10001111 |
| 145 | 91 | 10010001 |
| 146 | 92 | 10010010 |
| 147 | 93 | 10010011 |

TO FIG. 6B

| DECIMAL | HEX | BINARY |
|---|---|---|
| 148 | 94 | 10010100 |
| 149 | 95 | 10010101 |
| 150 | 96 | 10010110 |
| 151 | 97 | 10010111 |
| 152 | 98 | 10011000 |
| 153 | 99 | 10011001 |
| 154 | 9A | 10011010 |
| 155 | 9B | 10011011 |
| 156 | 9C | 10011100 |
| 157 | 9D | 10011101 |
| 158 | 9E | 10011110 |
| 159 | 9F | 10011111 |
| 160 | A0 | 10100000 |
| 161 | A1 | 10100001 |
| 162 | A2 | 10100010 |
| 163 | A3 | 10100011 |
| 164 | A4 | 10100100 |
| 165 | A5 | 10100101 |
| 166 | A6 | 10100110 |
| 167 | A7 | 10100111 |
| 168 | A8 | 10101000 |
| 169 | A9 | 10101001 |
| 170 | AA | 10101010 |
| 171 | AB | 10101011 |
| 172 | AC | 10101100 |
| 173 | AD | 10101101 |
| 174 | AE | 10101110 |
| 175 | AF | 10101111 |
| 176 | B0 | 10110000 |
| 177 | B1 | 10110001 |
| 178 | B2 | 10110010 |
| 179 | B3 | 10110011 |
| 180 | B4 | 10110100 |
| 181 | B5 | 10110101 |
| 182 | B6 | 10110110 |
| 183 | B7 | 10110111 |
| 184 | B8 | 10111000 |
| 185 | B9 | 10111001 |
| 186 | BA | 10111010 |
| 187 | BB | 10111011 |
| 188 | BC | 10111100 |
| 189 | BD | 10111101 |
| 190 | BE | 10111110 |
| 191 | BF | 10111111 |
| 192 | C0 | 11000000 |
| 193 | C1 | 11000001 |
| 194 | C2 | 11000010 |
| 195 | C3 | 11000011 |
| 196 | C4 | 11000100 |
| 197 | C5 | 11000101 |
| 198 | C6 | 11000110 |
| 199 | C7 | 11000111 |
| 200 | C8 | 11001000 |
| 201 | C9 | 11001001 |
| 202 | CA | 11001010 |
| 203 | CB | 11001011 |
| 204 | CC | 11001100 |
| 205 | CD | 11001101 |
| 206 | CE | 11001110 |
| 207 | CF | 11001111 |
| 208 | D0 | 11010000 |
| 209 | D1 | 11010001 |
| 210 | D2 | 11010010 |
| 211 | D3 | 11010011 |
| 212 | D4 | 11010100 |
| 213 | D5 | 11010101 |
| 214 | D6 | 11010110 |
| 215 | D7 | 11010111 |
| 216 | D8 | 11011000 |
| 217 | D9 | 11011001 |
| 218 | DA | 11011010 |
| 219 | DB | 11011011 |
| 220 | DC | 11011100 |
| 221 | DD | 11011101 |
| 222 | DE | 11011110 |
| 223 | DF | 11011111 |
| 224 | E0 | 11100000 |
| 225 | E1 | 11100001 |
| 226 | E2 | 11100010 |
| 227 | E3 | 11100011 |
| 228 | E4 | 11100100 |
| 229 | E5 | 11100101 |
| 230 | E6 | 11100110 |
| 231 | E7 | 11100111 |
| 232 | E8 | 11101000 |
| 233 | E9 | 11101001 |
| 234 | EA | 11101010 |
| 235 | EB | 11101011 |
| 236 | EC | 11101100 |
| 237 | ED | 11101101 |
| 238 | EE | 11101110 |
| 239 | EF | 11101111 |
| 240 | F0 | 11110000 |
| 241 | F1 | 11110001 |
| 242 | F2 | 11110010 |
| 243 | F3 | 11110011 |
| 244 | F4 | 11110100 |
| 245 | F5 | 11110101 |
| 246 | F6 | 11110110 |
| 247 | F7 | 11110111 |
| 248 | F8 | 11111000 |
| 249 | F9 | 11111001 |
| 250 | FA | 11111010 |
| 251 | FB | 11111011 |
| 252 | FC | 11111100 |
| 253 | FD | 11111101 |
| 254 | FE | 11111110 |
| 255 | FF | 11111111 |

FIG. 6B

| 1F SEED | | |
|---|---|---|
| DECIMAL | HEX | BINARY |
| 0 | 00 | 00000000 |
| 1 | 01 | 00000001 |
| 2 | 02 | 00000010 |
| 3 | 03 | 00000011 |
| 4 | 04 | 00000100 |
| 5 | 05 | 00000101 |
| 6 | 06 | 00000110 |
| 8 | 08 | 00001000 |
| 9 | 09 | 00001001 |
| 10 | 0A | 00001010 |
| 12 | 0C | 00001100 |
| 16 | 10 | 00010000 |
| 17 | 11 | 00010001 |
| 18 | 12 | 00010010 |
| 20 | 14 | 00010100 |
| 24 | 18 | 00011000 |

FIG. 7

| FC SEED | | |
|---|---|---|
| DECIMAL | HEX | BINARY |
| 32 | 20 | 00100000 |
| 36 | 24 | 00100100 |
| 40 | 28 | 00101000 |
| 48 | 30 | 00110000 |
| 64 | 40 | 01000000 |
| 68 | 44 | 01000100 |
| 72 | 48 | 01001000 |
| 80 | 50 | 01010000 |
| 96 | 60 | 01100000 |
| 128 | 80 | 10000000 |
| 136 | 88 | 10010000 |
| 144 | 90 | 10010000 |
| 160 | A0 | 10100000 |
| 192 | C0 | 11000000 |

FIG. 8

| F3 SEED | | |
|---|---|---|
| DECIMAL | HEX | BINARY |
| 33 | 21 | 00100001 |
| 34 | 22 | 00100010 |
| 65 | 41 | 01000001 |
| 66 | 42 | 01000010 |
| 129 | 81 | 10000001 |
| 130 | 82 | 10000010 |

FIG. 9

FLASH SECTOR SEEDING TO REDUCE PROGRAM TIMES

BACKGROUND OF THE INVENTION

1. Field of the Invention

The present application relates generally to a dual mode memory system for in situ verification of capacitive power support.

2. Background of the Invention

A storage area network (SAN) is a network of storage disks. In large enterprises, a SAN connects multiple servers, or hosts, to a centralized pool of disk storage. Compared to managing hundreds of servers, each with its own disks, a SAN improves system administration. By treating all the company's storage as a single resource, disk maintenance and routine backups are easier to schedule and control. In some SANs, the disks themselves can copy data to other disks for backup without any processing overhead at the host computers.

A storage system typically comprises a plurality of storage devices and a storage controller in an enclosure. The storage controller may be a redundant array of independent disks (RAID) controller, for example. The storage controller receives host input/output (I/O) traffic to read and write data to the disk drives. The storage controller then reads data from or persists data to the disk drives via device I/O traffic. In storage systems, data is temporarily stored in volatile memory, such as Double Data Rate (DDR) Random Access Memory (RAM), due to the extremely fast access speeds that are required to meet maximum throughput to the disk drives.

BRIEF SUMMARY OF THE INVENTION

In one illustrative embodiment, a computer program product comprises a computer recordable medium having a computer readable program recorded thereon. The computer readable program, when executed on a computing device, causes the computing device to initialize a non-volatile memory system comprising a plurality of non-volatile memory portions to be programmed with data values and seed one of the plurality of non-volatile memory portions to form a seeded non-volatile memory portion such that a first set of data values may be written to an unseeded non-volatile memory portion within the plurality of non-volatile memory portions with a reduced programming time and a second set of data values may be written to the seeded non-volatile memory portion with a reduced programming time.

In another illustrative embodiment, a method is provided in a data processing system for flash sector seeding. The method comprises initializing a non-volatile memory system comprising a plurality of non-volatile memory portions to be programmed with data values and seeding one of the plurality of non-volatile memory portions to form a seeded non-volatile memory portion such that a first set of data values may be written to an unseeded non-volatile memory portion within the plurality of non-volatile memory portions with a reduced programming time and a second set of data values may be written to the seeded non-volatile memory portion with a reduced programming time.

In another illustrative embodiment, a memory system comprises a controller, a volatile memory, and a non-volatile memory. The non-volatile memory is used to store data from the volatile memory. The controller is configured to initialize a non-volatile memory system comprising a plurality of non-volatile memory portions to be programmed with data values and seed one of the plurality of non-volatile memory portions to form a seeded non-volatile memory portion such that a first set of data values may be written to an unseeded non-volatile memory portion within the plurality of non-volatile memory portions with a reduced programming time and a second set of data values may be written to the seeded non-volatile memory portion with a reduced programming time.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 6A and 6B depict a table of the data values that may be stored in an unseeded flash memory with reduced programming time in accordance with an illustrative embodiment;

FIG. 7 depicts a table of the data values that may be stored in a flash memory seeded with 0x1Fh with reduced programming time in accordance with an exemplary embodiment;

FIG. 8 depicts a table of the data values that may be stored in a flash memory seeded with 0xFCh with reduced programming time in accordance with the exemplary embodiment;

FIG. 9 depicts a table of the data values that may be stored in a flash memory seeded with 0xF3h with reduced programming time in accordance with the exemplary embodiment;

DETAILED DESCRIPTION OF THE INVENTION

The illustrative embodiments provide a mechanism for in situ verification of capacitive power support. A memory system uses a super capacitor to support a voltage rail when input power is lost or interrupted. The voltage discharge curve is a function of load and capacitance of the component. By stepping the regulated power supply to a lower output within the voltage range and recording voltage and current draw at the super-capacitor as it discharges to the new regulator output voltage, the super capacitor holdup capability can be tested.

Figure 1:
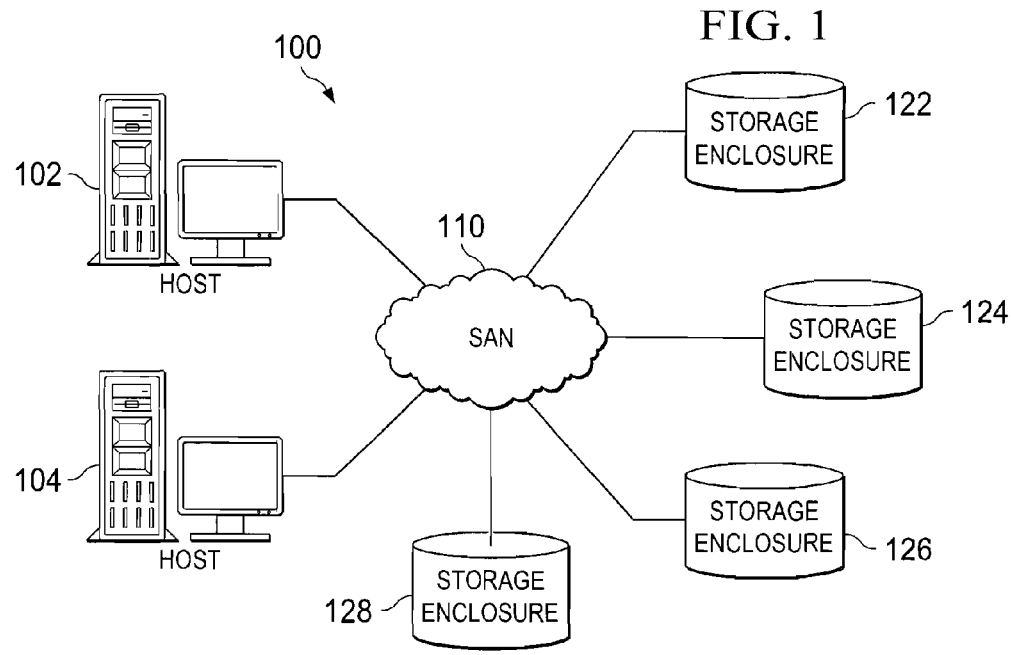
FIG. 1 depicts a pictorial representation of an exemplary distributed data processing system in which aspects of the illustrative embodiments may be implemented.
Figure 2:
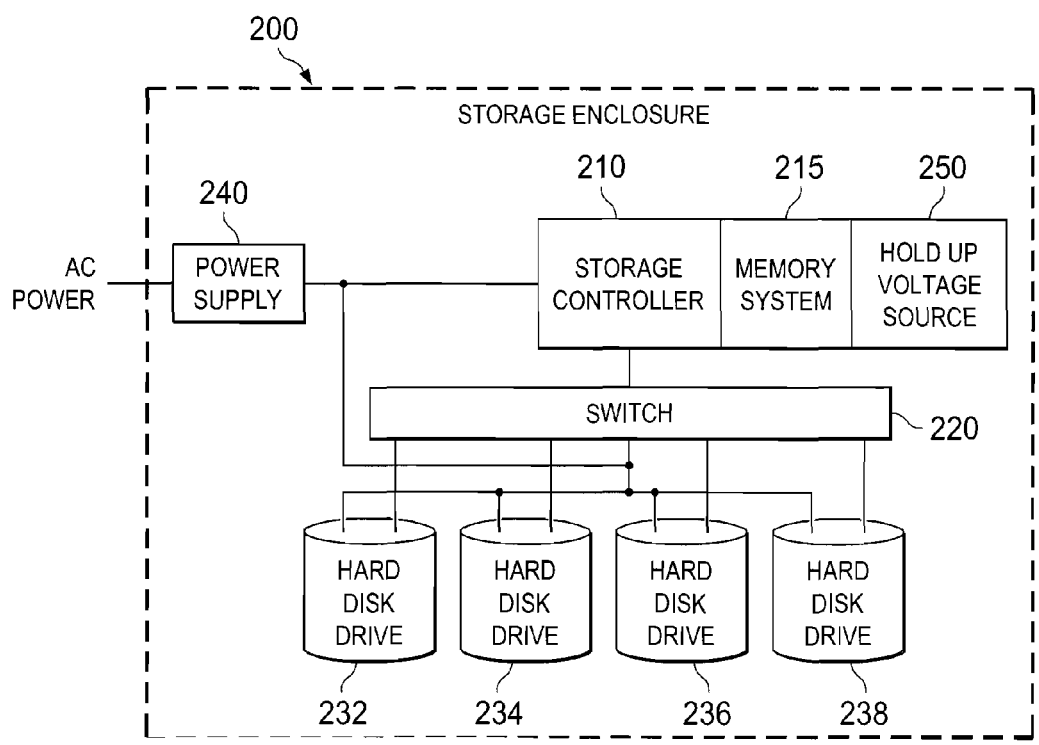
FIG. 2 is a block diagram depicting an exemplary storage enclosure in accordance with an illustrative embodiment.

The illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as exemplary environments in which exemplary aspects of the illustrative embodiments may be implemented. While the description following FIGS. 1 and 2 will focus primarily on a storage enclosure implementation, this is only exemplary and is not intended to state or imply any limitation with regard to the features of the present invention. To the contrary, the illustrative embodiments are intended to include any embodiments in which a super-capacitor is used to temporarily hold up voltage for components.

With reference now to the figures and in particular with reference to FIGS. 1 and 2, exemplary diagrams of data processing environments are provided in which illustrative embodiments of the present invention may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one storage area network 110, which is the medium used to provide communication links between various devices and computers, such as host computers and storage enclosures, connected together within distributed data processing system 100. Storage area network 110 may include connections, such as wire, wireless communication links, serial attached small computer systems interface (serial attached SCSI or SAS) switches, or fiber optic cables.

In the depicted example, host computer 102 and host computer 104 are connected to storage area network (SAN) 110 along with storage enclosures 122, 124, 126, and 128. A storage enclosure includes a storage controller and connection to one or more hard disk drives. The storage controller may be a simple controller for storing data to the hard disk drives, or alternatively may include a redundant array of independent disks (RAID) controller. Distributed data processing system 100 may include additional hosts, storage enclosures, clients, and other devices not shown.

In the depicted example, SAN 110 may use the Transmission Control Protocol/Internet Protocol (TCP/IP) suite of protocols to communicate with one another; however, more likely, SAN 110 may use a protocol associated with Fibre Channel (FC) or Serial attached SCSI (SAS). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram depicting an exemplary storage enclosure in accordance with an illustrative embodiment. Storage enclosure 200 comprises storage controller 210, which may be a redundant array of independent disks (RAID) controller or a non-RAID controller. Storage controller 210 communicates with hard disk drives (HDDs) 232, 234, 236, and 238 through switch 220. Switch 220 may be, for example, a serial attached SCSI (SAS) switch. Other devices in a storage area network (SAN) may write data to or read data from storage enclosure 200 by connection to switch 220.

Storage controller 210 may store data temporarily in memory system 215 before persisting the data to HDDs 232-238. Memory system 215 may comprise a Double Data Rate (DDR) memory system that provides fast access speeds to meet required maximum throughput to HDDs 232-238. DDR memory is a volatile memory.

Power supply 240 receives alternating current (AC) power and provides direct current (DC) power to the components within storage enclosure 200. More particularly, power supply 240 provides DC power to storage controller 210, memory system 215, switch 220, and HDDs 232-238. If AC power to storage enclosure 200 is lost or interrupted, then there is a data integrity exposure within memory system 215.

One approach to solving data integrity exposure due to power failure is to hold up power to the entire enclosure using hold up voltage source 250 while the data is written to disk. This approach requires very large and expensive uninterruptible power supply (UPS) units. Another approach involves using a small battery and placing the memory into self refresh mode. Typically, a battery may allow the volatile memory to hold data for 72 hours. Even this battery can become large and expensive. Both solutions require chemical batteries to be used, which can also create safety hazards if not used or disposed of properly.

In accordance with an illustrative embodiment, memory system 215 includes a non-volatile storage element that is used to save data from the volatile memory when power is lost and a super capacitor that is used to hold up the voltage while the data is saved to non-volatile storage.

Figure 3:
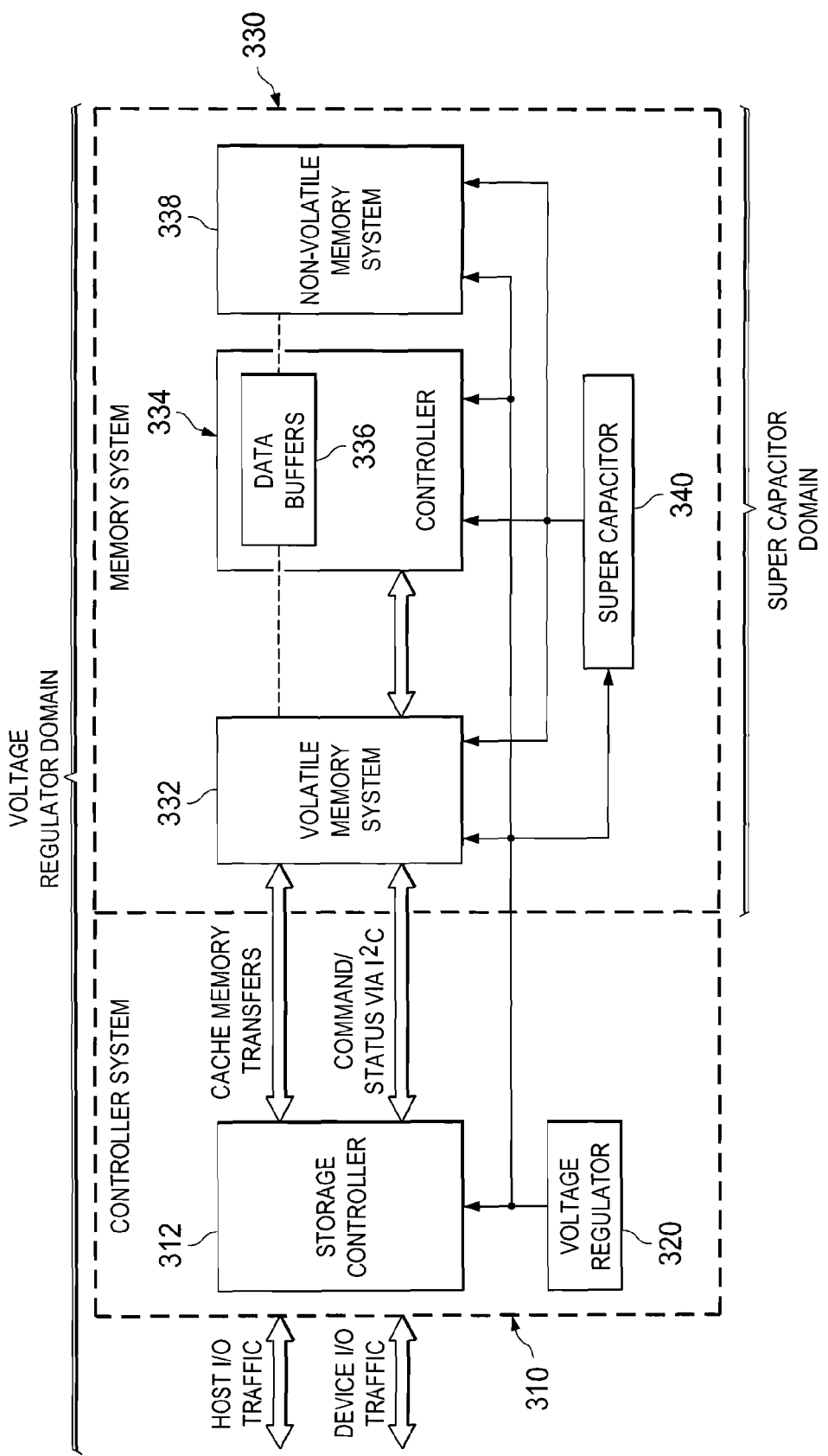
FIG. 3 is a block diagram illustrating a controller system and memory system in accordance with an illustrative embodiment.

FIG. 3 is a block diagram illustrating a controller system and memory system in accordance with an illustrative embodiment. Controller system 310 comprises storage controller 312 and voltage regulator 320. Controller system 310 receives host input/output (I/O) traffic to load data to or store data from the host. Controller system 310 also receives device I/O traffic to store data to or load data from storage devices. Storage controller 312 temporarily stores data in volatile memory system 332 within memory system 330 via cache memory transfers. Storage controller 312 also performs commands and updates status information using an inter-integrated circuit ($I^2C$) bus.

Memory system 330 comprises volatile memory system 332, non-volatile memory system 338, controller 334, and super capacitor 340. Volatile memory system 332 may be a Double Data Rate (DDR) memory, for example. Non-volatile memory system 338 may be a flash memory, for example. Controller 334 stores data from volatile memory system 332 to non-volatile memory system 338. Controller 334 may store data temporarily in data buffers 336 as data is transferred to non-volatile memory system 338.

Voltage regulator 320 provides direct current (DC) power to storage controller 312, volatile memory system 332, controller 334, and non-volatile memory system 338. Voltage regulator 320 may provide a voltage in the range of 3.0V to 3.5V, such as 3.3V, for example. However, the voltage may be higher or lower depending on the implementation. Voltage regulator 320 also provides DC power to charge super capacitor 340 to a predetermined voltage limit. Responsive to normal power being lost from voltage regulator 320, super capacitor 340 becomes the source of power for volatile memory system 332, controller 334, and non-volatile memory system 338.

As memory system 330 hardens the data (transfers the data from volatile memory system 332 to non-volatile memory system 338), super capacitor 340 begins to discharge. At some point, the voltage provided by super capacitor 340 begins to decay as a function of the load. When the voltage of super capacitor 340 falls below the minimum voltage requirement of memory system 330, operation may become nondeterministic and failures may occur.

In one exemplary embodiment, the volatile memory system 332 may be implemented as a Double Data Rate (DDR) memory, for example, such as in the form of a dual inline memory module (DIMM). In an exemplary embodiment, non-volatile memory system 338 may be implemented as one or more flash memories. Unlike dynamic random access memory (DRAM) based devices where data can be written to or read from using relatively straight forward timings and commands, non-volatile memories, such as flash devices, can be read relatively quickly—70 ns being a typical access time, for example. However, programming (write) time may be quite lengthy.

In known flash devices, one does not technically program a binary value of 1 to the memory. Rather, one must erase to a one (1) and then convert selected bits to zero (0). The standard process for updating a flash device is to erase a sector (or entire device), which sets all data in that portion to all ones. Next, one must program with the desired data by leaving bits that are to be stored as a one in their pre-programmed state and converting bits that are to be stored as a zero. Once complete, data can then be read relatively quickly.

While read times are approximately 70 ns, program times may be 11 µs as a typical value. One common method to reduce overall program time is to have the flash memory pre-erased (to all ones). As noted above, programming the flash device then consists of converting selected bits from a one value to a zero value. The more ones in a data byte, the faster the programming time for that data byte. Also, it should be noted that once a byte in a non-volatile flash memory is programmed, the byte may be reprogrammed as long as reprogramming the byte does not require converting a zero value to a one value. For instance, the binary value of '01111111' may be programmed by converting a single one value to a zero. The binary value of '01111101' may then be written to the same location by converting another one value to a zero.

Figures 4, 5:
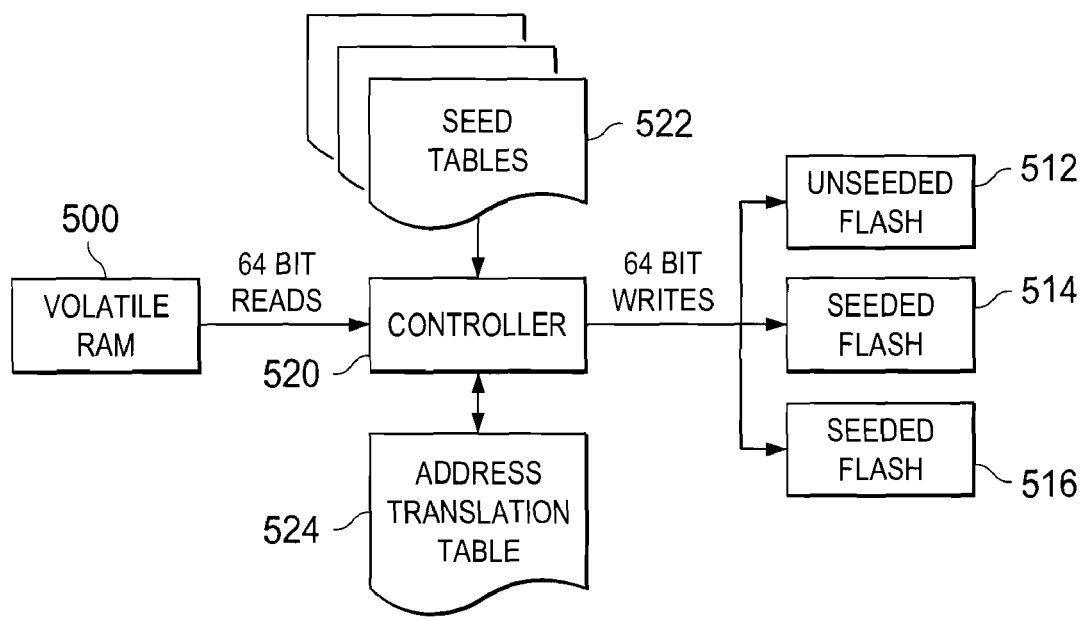
FIG. 4 is a table illustrating measured programming times for a non-volatile memory device in accordance with an illustrative embodiment.
FIG. 5 is a block diagram of a memory system with flash sector seeding in accordance with an illustrative embodiment.

Connecting a logic analyzer to a non-volatile memory device reveals that the programming time varies drastically depending upon the number of zero bits in a data byte being written. FIG. 4 is a table illustrating measured programming times for a non-volatile memory device in accordance with an illustrative embodiment. The measured programming times are based on RDY/BSY pin assertion time. As seen in the table of FIG. 4, if the data byte being programmed has six, seven, or eight zeros, then the programming time is approximately 12.7 µs; if the data byte has one, two, three, four, or five zeros, then the programming time is approximately 9.8 µs; and, if the data byte being programmed does not have any zeros (0xFFh), then the programming time is approximately 2.1 µs.

From the above, it is clear that the programming time for a non-volatile flash memory depends greatly on the number of ones that are to be converted to zeros. In accordance with an illustrative embodiment, a non-volatile flash memory, such as non-volatile memory system 338 in FIG. 3, for example, comprises a plurality of non-volatile memories where a first non-volatile memory is pre-programmed (erased) with all ones, and at least a second non-volatile memory is pre-programmed with a seed value that takes advantage of the reduced programming time for less than six zeros. In other words, one or more non-volatile memories are programmed with values other than 0xFFh (all ones) to reduce programming time.

For example, there are thirty-six combinations of byte values that have six or more zeros (14% of all possible values). If a sector of non-volatile memory is seeded with 0x3Fh instead of the normal 0xFFh value, then of the thirty-six numbers (14% of all possible values) with six or more zeros, twenty-one of them can be programmed into this sector with a 23% programming time reduction. That leaves only fifteen data values (6% of all possible values) that would take 12.7 µs to program.

In an alternative embodiment, three or more non-volatile memories may be provided to ensure that every data value being programmed may be programmed into a non-volatile memory converting less than six one values to a zero value. The controller may select a non-volatile memory to write a data byte based on the data byte itself such that the selected non-volatile memory is seeded to allow a faster programming time. The controller may then keep track of which data bytes are stored in which non-volatile memories in an address translation table. Thus, when a read request is received, the controller accesses the appropriate non-volatile memory.

The plurality of non-volatile memories may be pre-programmed sectors of a non-volatile memory device. Alternatively, the plurality of non-volatile memories may be separate memory devices. In one exemplary embodiment, the entire storage capacity of the non-volatile memory system may be duplicated for each seed value. That is, if the storage capacity of the non-volatile memory is to be 5 GB, then there may be a 5 GB memory that is completely erased, a 5 GB memory that is pre-programmed with a first seed value, a 5 GB memory that is pre-programmed with a second seed value, and so forth. In an alternative embodiment, the seeded non-volatile memories may have a smaller capacity that is proportional to the number of data values that are likely to be stored therein. For instance, if a given seed value covers 9% of all possible values, then the non-volatile memory that is pre-programmed with the given seed value may be 9% of the storage capacity of the entire non-volatile memory system, 9% of the storage capacity of the unseeded non-volatile memory, or some other predetermined portion of the storage capacity.

In one embodiment, the non-volatile memory system may consider the data as a block and determine the best sector to which to write the block. Considering the data as a block may make address translation easier and/or faster.

FIG. 5 is a block diagram of a memory system with flash sector seeding in accordance with an illustrative embodiment. Controller 520 makes reads from volatile random access memory 500 and writes the data to flash 512-516. Volatile RAM 500 may be, for example, a cache, such as data cache for storage controller 312 in FIG. 3, or any other data to be stored in non-volatile memory. For instance, controller 520 may write data to flash 512-516 to harden cache data in case of a power event, checkpoint a data processing system for faster system restore after being in sleep or hibernation mode, store media files for a portable media player, store picture files for a digital camera, and so forth.

For a given data byte read from volatile RAM 500, controller 520 determines a corresponding one of Flash portions 512-516 in which to store the data byte. Flash portions 512-516 may be sectors of a Flash device or, alternatively, separate Flash devices, for example. In the depicted example, Flash 512 is unseeded. In other words Flash 512 is erased to all ones as described above. Flash 514 is seeded with a first seed value, and Flash 516 is seeded with a second seed value. There may be more or fewer Flash portions depending upon the implementation. In one exemplary embodiment, there are enough Flash portions such that any data byte may be programmed without converting six or more ones to zeros, thus ensuring a reduced programming time for every possible data byte. However, Flash portions 512-516 may comprise various combination and configurations within the spirit and scope of the illustrative embodiments, depending on desired programming time limitations, cost considerations, space constraints, and so forth.

When determining a Flash portion 512-516 in which to store a data byte, controller 520 may perform a lookup operation in seed tables 522. Seed tables 522 may comprise one or more tables that associate various data values with the unseeded or seeded Flash portions 512-516 that support reduced programming times for the corresponding data values. For example, a binary value of '00111100' (0x3Ch) may be written to unseeded Flash 512, but a binary value of '11100010' (0xE2h) must be written to Flash 514 or Flash 516 to ensure a faster programming time. Seed tables 522 may be loaded into volatile memory, such as volatile memory system 332 in FIG. 3, for example.

When controller 520 writes a data byte to one of Flash portions 512-516, controller 520 adds an entry to address translation table 524. Address translation table 524 keeps track of where data bytes are stored in Flash 512-516. For example, an entry in address translation table 524 may associate a global address with an identification of the Flash portion 512-516 to which the byte is stored and an address within the Flash portion. Thus, when controller 520 reads from Flash 512-516 to restore a data byte to volatile RAM 500, controller 520 may lookup a current address being read in address translation table 524, identify the Flash portion 512-516 from which to read the data byte, and identify the address within the identified Flash portion to perform the read. Address translation table 524 may be stored in volatile memory, such as volatile memory system 332 in FIG. 3, for example.

A flash memory pre-erased to 0xFFh covers 86% of data bytes being written without converting six or more ones to zeros. FIGS. 6A and 6B depict a table of the data values that may be stored in an unseeded flash memory with reduced programming time in accordance with an illustrative embodiment. FIGS. 6A and 6B list the decimal, hexadecimal, and binary forms of the two hundred twenty possible data bytes that may be stored in the unseeded flash memory with reduced programming time.

In one exemplary embodiment, the controller seeds flash memory portions with three other values in order to reduce programming time for every possible data value. A seed value of 0x1Fh covers sixteen of the previously uncovered data bytes. FIG. 7 depicts a table of the data values that may be stored in a flash memory seeded with 0x1Fh with reduced programming time in accordance with an exemplary embodiment. A seed value of 0xFCh covers fourteen of the previously uncovered data bytes. FIG. 8 depicts a table of the data values that may be stored in a flash memory seeded with 0xFCh with reduced programming time in accordance with the exemplary embodiment. A seed value of 0xF3h covers six of the previously uncovered data bytes. FIG. 9 depicts a table of the data values that may be stored in a flash memory seeded with 0xF3h with reduced programming time in accordance with the exemplary embodiment.

By using the above three seed values along with an unseeded, pre-erased portion, all data byte combinations may be covered to ensure that there is an area in the non-volatile memory to program every data byte without ever converting more than five ones to zero, thus reducing flash programming time. Thus, in this exemplary embodiment, four flash sectors or devices are used to store all possible data byte values. The memory controller determines a flash portion in which to store each data byte based on a number of ones to be converted to zeros in the data byte. The memory controller then keeps track of where each data byte is stored for later access.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 10:
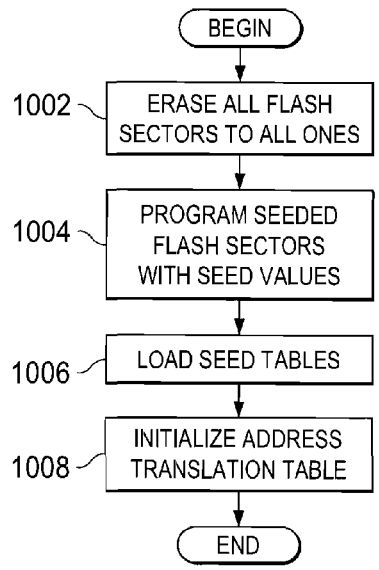
FIG. 10 is a flowchart illustrating operation of a memory system for flash sector seeding in accordance with an illustrative embodiment.

FIG. 10 is a flowchart illustrating operation of a memory system for flash sector seeding in accordance with an illustrative embodiment. Operation begins when the memory system is powered on, and the memory system erases all flash sectors to all ones (block 1002). As stated above, the memory system may initialize flash memory sectors or other portions of flash memory, such as separate flash memory devices, for example. Next, the memory system programs the seeded flash sectors with seed values to reduce program times for all or a portion of possible data values (block 1004) and loads the seed tables (block 1006). Then, the memory system initializes the address translation table (block 1008). Thereafter, operation ends.

Figure 11:
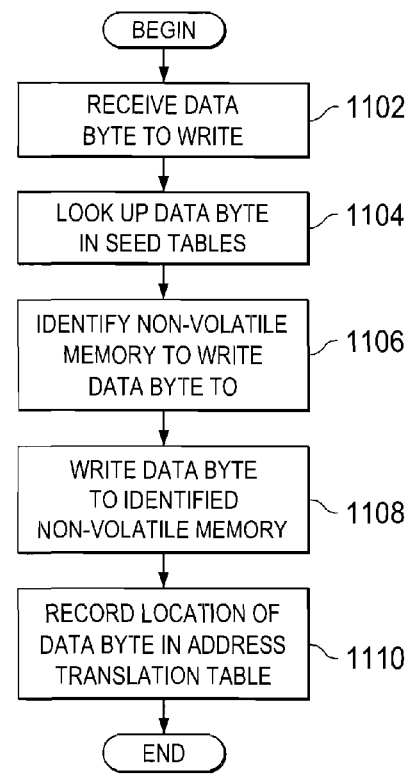
FIG. 11 is a flowchart illustrating operation of a memory system for programming a data value in a non-volatile memory with flash sector seeding in accordance with an illustrative embodiment.

FIG. 11 is a flowchart illustrating operation of a memory system for programming a data value in a non-volatile memory with flash sector seeding in accordance with an illustrative embodiment. Operation begins, and the memory system receives a data byte to be written (block 1102). The memory system then looks up the data byte in one or more seed tables to determine a portion of non-volatile memory to which the memory system may write the data byte with a reduced programming time (block 1104). A person of ordinary skill in the art will recognize that while the memory system may seed the non-volatile (flash) memory and write data values as data bytes, the memory system may also seed the memory according to data words, double-words, etc.

After looking up the data byte, the memory system then identifies a non-volatile memory portion to which the data byte is to be written (block 1106) and writes the data byte to the identified non-volatile memory portion (block 1108). The memory system writes the data byte by converting the appropriate bits from a one value to a zero value. Because of the seeding of the non-volatile memory portions (e.g., flash memory sectors), the memory system converts fewer than six ones to zeros for each data byte, thus reducing programming time. The memory system then records the location of the data byte in an address translation table (block 1110) so the data byte may be accessed. Thereafter, operation ends.

Figure 12:
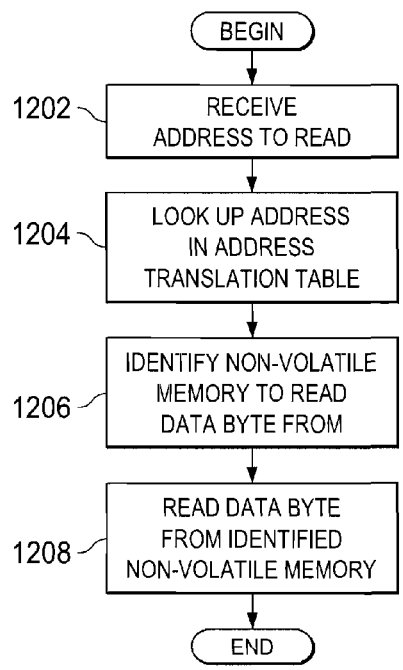
FIG. 12 is a flowchart illustrating operation of a memory system for reading a data value in a non-volatile memory with flash sector seeding in accordance with an illustrative embodiment.

FIG. 12 is a flowchart illustrating operation of a memory system for reading a data value in a non-volatile memory with flash sector seeding in accordance with an illustrative embodiment. Operation begins, and the memory system receives an address from which it is to read a data byte (block 1202). The memory system then looks up the address in the address translation table to determine a portion of non-volatile memory and an address within the non-volatile memory from which the memory system may read the data byte (block 1204). The memory system identifies the non-volatile memory portion from which to read the data byte (block 1206). Then, the memory system reads the data byte from the identified non-volatile memory portion at the identified address (block 1208). Thereafter, operation ends.

Thus, the illustrative embodiments provide mechanisms for flash sector seeding to reduce programming times. A non-volatile flash memory comprises a plurality of non-volatile memories where a first non-volatile memory is pre-programmed (erased) with all ones, and at least a second non-volatile memory is pre-programmed with a seed value that takes advantage of the reduced programming time for less than six zeros. When writing (programming) a data byte, the memory system looks up the data byte in one or more seed tables to determine a portion of non-volatile memory to which the memory system may write the data byte with a reduced programming time. The memory system then records the location of the data byte in an address translation table so the data byte may be accessed.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable medium having a computer readable program recorded thereon, wherein the computer readable program, when executed on a computing device, causes the computing device to:
    initialize a non-volatile memory system comprising a plurality of non-volatile memory portions to be programmed with data values, wherein initializing the non-volatile memory system comprises erasing the plurality of non-volatile memory portions to all one (1) bits; and
    seed one of the plurality of non-volatile memory portions to form a seeded non-volatile memory portion such that writing a first set of data values to an unseeded non-volatile memory portion within the plurality of non-volatile memory portions results in a reduced programming time and writing a second set of data values to the seeded non-volatile memory portion results in a reduced programming time, wherein seeding one of the plurality of non-volatile memory portions comprises programming the one of the plurality of non-volatile memory portions with a binary seed value having at least one zero bit;
    receive a data portion to be written to the non-volatile memory system;
    identify one of the plurality of non-volatile memory portions to write the data portion to based on a number of ones to be converted to zeros for each data byte of the data portion, wherein identifying one of the plurality of non-volatile memory portions to write the data byte to comprises looking up the data portion in one or more seed tables, wherein each of the one or more seed tables associates a set of data byte values with a corresponding non-volatile memory portion such that writing each of the set of data byte values to the corresponding non-volatile memory portion comprises converting fewer than six ones to zeros; and
    write the data portion to the identified one of the plurality of non-volatile memory portions such that writing the data portion comprises converting fewer than six ones to zeros for a given data byte of the data portion.

2. The computer program product of claim 1, wherein the data portion is a data block.

3. The computer program product of claim 1, wherein the computer readable program further causes the computing device to:
    update an address translation table to associate an address of the data portion with the identified non-volatile memory portion and a location within the non-volatile memory portion where the data portion is written.

4. The computer program product of claim 3, wherein the computer readable program further causes the computing device to:
    responsive to a request to read a requested data portion from an address within the non-volatile memory system, look up an address within the address translation table to identify a non-volatile memory portion and a location within the identified non-volatile memory portion at which the requested data portion is written; and
    read the requested data portion from identified non-volatile memory portion at the identified location.

5. The computer program product of claim 1, wherein the non-volatile memory system is a flash memory system and wherein the plurality of non-volatile memory portions comprises a plurality of flash memory sectors.

6. A method, in a data processing system, for flash sector seeding, the method comprising:
    initializing a non-volatile memory system comprising a plurality of non-volatile memory portions to be programmed with data values, wherein initializing the non-volatile memory system comprises erasing the plurality of non-volatile memory portions to all one (1) bits; and
    seeding one of the plurality of non-volatile memory portions to form a seeded non-volatile memory portion such that writing a first set of data values to an unseeded non-volatile memory portion within the plurality of non-volatile memory portions results in a reduced programming time and writing a second set of data values to the seeded non-volatile memory portion results in a reduced programming time, wherein seeding one of the plurality of non-volatile memory portions comprises programming the one of the plurality of non-volatile memory portions with a binary seed value having at least one zero bit;
    receiving a data portion to be written to the non-volatile memory system;
    identify one of the plurality of non-volatile memory portions to write the data portion to based on a number of ones to be converted to zeros for each data byte of the data portion, wherein identifying one of the plurality of non-volatile memory portions to write the data byte to comprises looking up the data portion in one or more seed tables, wherein each of the one or more seed tables associates a set of data byte values with a corresponding non-volatile memory portion such that writing each of the set of data byte values to the corresponding non-volatile memory portion comprises converting fewer than six ones to zeros; and
    writing the data portion to the identified one of the plurality of non-volatile memory portions such that writing the data portion comprises converting fewer than six ones to zeros for a given data byte of the data portion.

7. The method of claim 6, further comprising:
    updating an address translation table to associate an address of the data portion with the identified non-volatile memory portion and a location within the non-volatile memory portion where the data portion is written;
    responsive to a request to read a requested data portion from an address within the non-volatile memory system, look up an address within the address translation table to identify a non-volatile memory portion and a location within the identified non-volatile memory portion at which the requested data portion is written; and read the requested data portion from identified non-volatile memory portion at the identified location.

8. The method of claim 6, wherein the non-volatile memory system is a flash memory system and wherein the plurality of non-volatile memory portions comprises a plurality of flash memory sectors.

9. A memory system comprising:

a controller;

a volatile memory; and a non-volatile memory, wherein the non-volatile memory is used to store data from the volatile memory;

wherein the controller is configured to initialize a non-volatile memory system comprising a plurality of non-volatile memory portions to be programmed with data values, wherein initializing the non-volatile memory system comprises erasing the plurality of non-volatile memory portions to all one (1) bits; and wherein the controller is configured to seed one of the plurality of non-volatile memory portions to form a seeded non-volatile memory portion such that writing a first set of data values to an unseeded non-volatile memory portion within the plurality of non-volatile memory portions results in a reduced programming time and writing a second set of data values to the seeded non-volatile memory portion results in a reduced programming time, wherein seeding one of the plurality of non-volatile memory portions comprises programming the one of the plurality of non-volatile memory portions with a binary seed value having at least one zero bit;

wherein the controller is configured to receive a data portion to be written to the non-volatile memory system;

wherein the controller is configured to identify one of the plurality of non-volatile memory portions to write the data portion to based on a number of ones to be converted to zeros for each data byte of the data portion, wherein identifying one of the plurality of non-volatile memory portions to write the data byte to comprises looking up the data portion in one or more seed tables, wherein each of the one or more seed tables associates a set of data byte values with a corresponding non-volatile memory portion such that writing each of the set of data byte values to the corresponding non-volatile memory portion comprises converting fewer than six ones to zeros; and wherein the controller is configured to write the data portion to the identified one of the plurality of non-volatile memory portions such that writing the data portion comprises converting fewer than six ones to zeros for a given data byte of the data portion.

10. The memory system of claim 9, wherein the non-volatile memory system is a flash memory system and wherein the plurality of non-volatile memory portions comprises a plurality of flash memory sectors.

* * * * *